United States Patent
Koker et al.

(10) Patent No.: US 6,542,945 B1
(45) Date of Patent: Apr. 1, 2003

(54) INSTANT CONFIGURATION OF A DIGITAL DEVICE

(75) Inventors: Altug Koker, Rancho Cordova, CA (US); Himanshu Sinha, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/407,020

(22) Filed: Sep. 28, 1999

(51) Int. Cl.[7] .............................................. G06F 13/00

(52) U.S. Cl. .............................. 710/104; 710/8; 710/10; 713/1; 713/2; 713/400; 709/220

(58) Field of Search .......................... 710/1, 8, 10, 104, 710/33, 41, 11, 12–14, 29; 713/1, 2, 100, 400; 709/221, 222, 220

(56) References Cited

U.S. PATENT DOCUMENTS

| 5,164,988 A | * | 11/1992 | Matyas et al. ................. 380/25 |
| 5,258,934 A | * | 11/1993 | Agranat et al. ................ 708/7 |
| 5,437,043 A | * | 7/1995 | Fujii et al. ................... 395/800 |
| 5,513,366 A | * | 4/1996 | Agarwal et al. ............. 395/800 |
| 5,634,033 A | * | 5/1997 | Stewart et al. ............... 711/114 |
| 5,832,288 A | * | 11/1998 | Wong ............................. 712/5 |
| 6,178,502 B1 | * | 1/2001 | Caswell et al. ................ 713/1 |

* cited by examiner

Primary Examiner—Jeffrey Gaffin
Assistant Examiner—Rijue Mai
(74) Attorney, Agent, or Firm—Blakely, Sokoloff, Taylor & Zafman LLP (57) ABSTRACT

An apparatus and method for instantly configuring a controller are provided. In one embodiment, a controller is configured by selecting an simultaneous configuration input vector, and placing at least a portion of the configuration input vector in a plurality of registers in the controller during a single clock cycle.

19 Claims, 6 Drawing Sheets

INSTANT CONFIGURATION OF A DIGITAL DEVICE

FIELD OF INVENTION

This invention relates generally to a digital-platform, and in particular to configuring the digital platform.

BACKGROUND OF THE INVENTION

Figure 1:
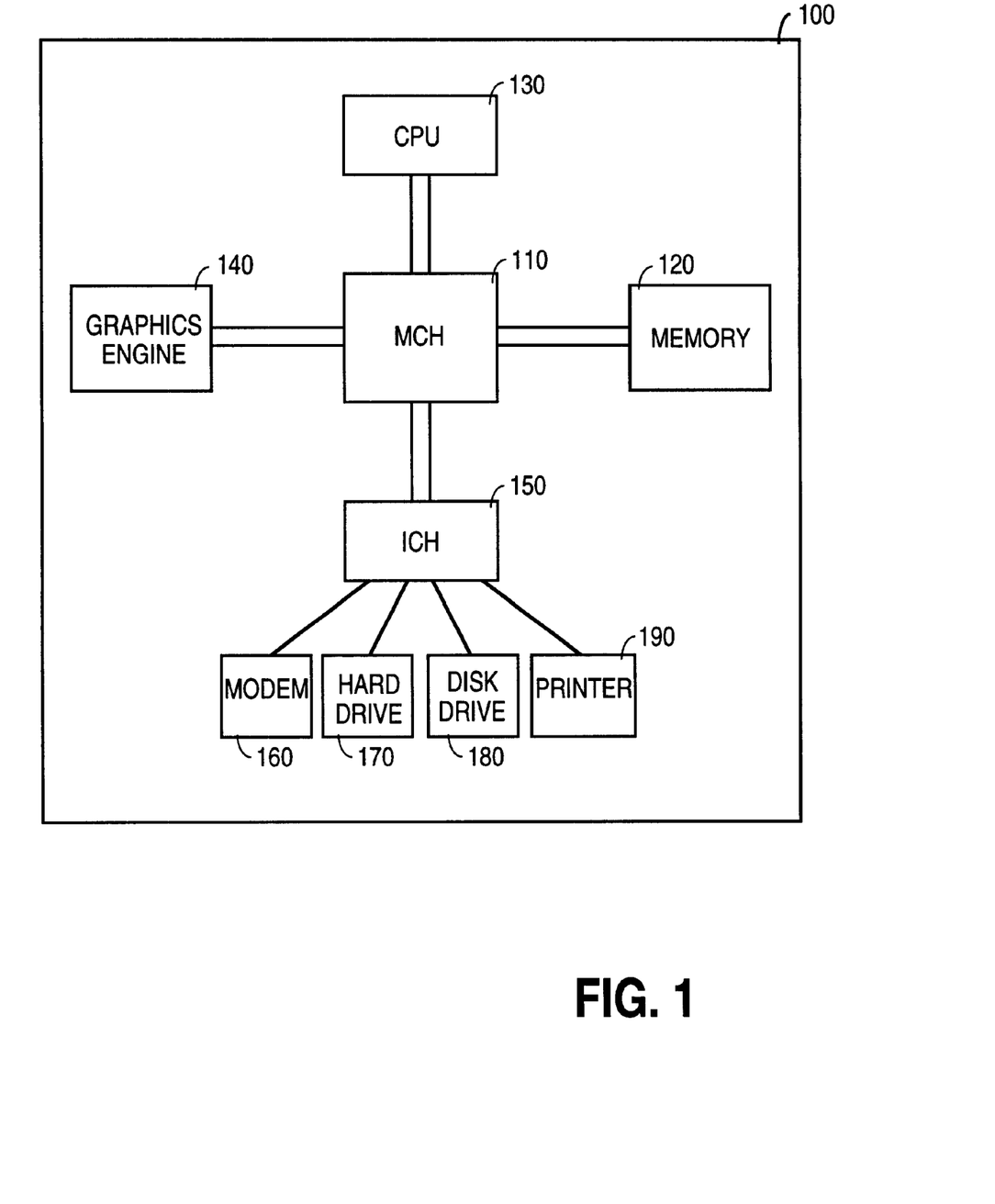
FIG. 1 is a block diagram of an embodiment of a computer system.

FIG. 1 illustrates a typical computer system. Referring to FIG. 1, a memory controller hub 110 controls the flow of data between the system memory 120 of a computer 100 and other components of the computer, such as the CPU 130, input-output (I/O) controller 150, or a graphics engine 140. The controller is programmed to adjust the flow of data between system components as a function of the system components' characteristics.

For example, if a computer system architecture has a 600 MHz CPU, 128 MB RAM of system memory, and a 100 MHz bus, these characteristics are programmed into the memory controller. The features of data transfer, such as arbitration, bandwidth, memory access ranges, and memory timings are then optimized by the memory controller as a function of the system architecture.

The memory controller is programmable so that if the system architecture changes, the controller can be reprogrammed, or reconfigured, to adjust the flow of data based on the characteristics of the new system components. Typically the memory controller is programmed when a computer system is powered up. The BIOS programs the memory controller based on the system components, such as a system memory, CPU, and graphics engine.

One problem of programming the controller is that only one register of the memory controller is programmed at a time. If the memory controller has 10,000 registers, for example, then 30 to 40 clock cycles are needed to program each register of the memory controller. This delay can be very long, especially for applications that require the system architecture to change on a frequent basis.

For example, a simulation model of a computer system architecture is used to simulate the effects that different types of components have on the overall performance of a computer system. During simulation, one component, such as the CPU for example, is modeled to perform with different operating characteristics, such as clock speed. Every time the clock speed of the CPU model changes, the configuration of the memory controller should change as well, so that the system performance is optimized for the new clock speed. The delay caused by reconfiguring the memory controller reduces the efficiency of the simulation testing of the system architecture.

SUMMARY OF THE INVENTION

An apparatus and method for instantly configuring a controller are provided. In one embodiment, a controller is configured by selecting a configuration input vector, and placing at least a portion of the configuration input vector in a plurality of registers in the controller during a single clock cycle.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

An apparatus and method for instantly configuring a controller are described. In the following description, numerous details are set forth, such as distances between components, types of molding, etc. It will be apparent, however, to one skilled in the art, that the present invention, may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2:
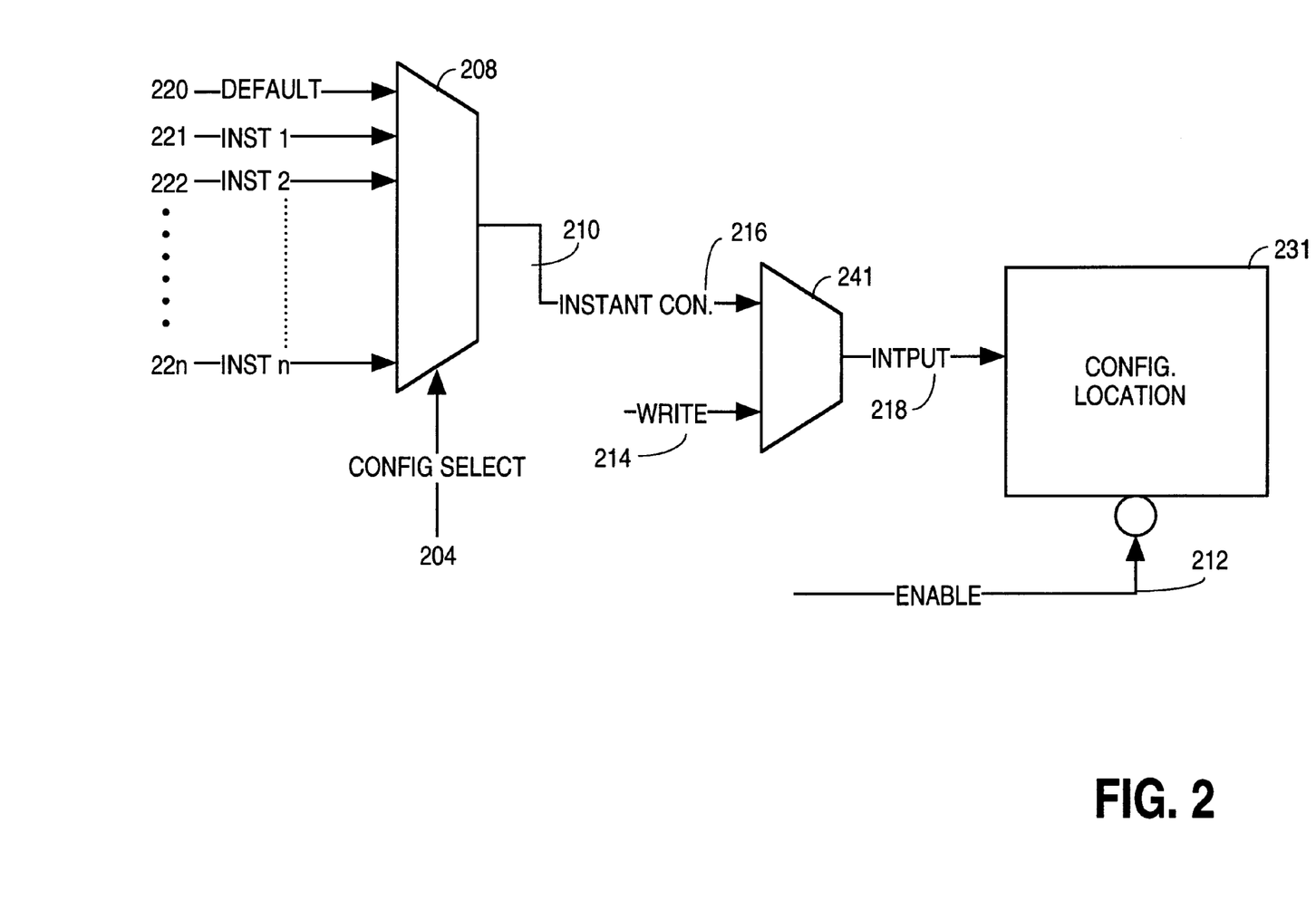
FIG. 2 is a block diagram of an embodiment of an apparatus used to configure a single cell of a controller.

FIG. 2 shows an embodiment of an apparatus used to configure a single register of the controller, which may be a memory controller, for example. The controller register 231 can be configured when it receives enable signal 212. The input 218 contains the configuration data that is written into register 231. Multiplexer 241 provides this data, either from write input 214 or from simultaneous input 216.

The configuration data for only one register 231 is sent from write input 214 during a single clock cycle. Thus, a separate clock cycle is needed to configure, or program, each register in the memory controller.

With the single write path from multiplexer 241, the CPU writes to one register at a time. Each register is programmed during a separate cycle, because multiple registers cannot be programmed at the same time.

If the components in the computer system architecture are known, then the configuration of the memory controller can be stored as a set of predetermined values. If several variations of components are used, then the different configurations for the memory controller that optimize each variation can also be predetermined.

For example, during simulation testing of a computer system architecture, each component, such as the CPU, may be a software model that emulates the performance of a CPU that is projected to be developed in the future (e.g., two years from now). The projected parameters of the CPU may include an operating speed of 600 MHz. Another emulated component, such as memory, may include a memory size of 128 megabytes. When testing a system architecture with these projected parameters, the configuration of the memory controller can be predetermined, and then loaded quickly into the memory controller.

The predetermined configuration of the memory controller can be used to define a configuration input vector. Thus, if there are eight predetermined memory controller configurations, then eight corresponding configuration input vectors can be defined. Each bit of an input vector is a value for a corresponding register in the memory controller. Each input vector, when input to the memory controller, can simultaneously configure all registers of the memory controller. Because all bits, or values, of the configuration input vector are loaded into their corresponding registers in the memory controller during the same clock cycle, the memory controller is instantly configured to improve or optimize the performance of the system architecture.

In one embodiment, one bit of an input vector can be loaded into the register 202 through configuration multiplexer 208. The values 220 through 22n each represent one bit of n different predetermined configurations. One of the predetermined configuration input vectors can be loaded into the register 231 during a special simultaneous configuration cycle. The simultaneous configuration select signal 204 is input into multiplexer 208. This signal 204 causes the normal write path 214 through selection multiplexer 241 to be disabled. The simultaneous configuration path 210 is enabled so that the appropriate value configuration from multiplexer 208 can be loaded into register 231. The signal 204 also selects which one of the n predetermined configurations will be loaded into the memory controller. Thus, if configuration 1 is selected, the value from input 221 of configuration multiplexer 208 will be transmitted through simultaneous configuration line 210 and through selection multiplexer 241 and input into register 231.

Each register 231 in the memory controller can be associated with a configuration multiplexer 208 that contains the appropriate set of input values for the given register. Each value in the set of input values is a portion of one of the predetermined configuration vectors. The configuration select request, or cycle, 204 is sent to all multiplexers 208 simultaneously during a single clock cycle. Thus, all values of a selected predetermined configuration input vector are sent from multiplexers 208 to registers 231 simultaneously.

Figure 3:
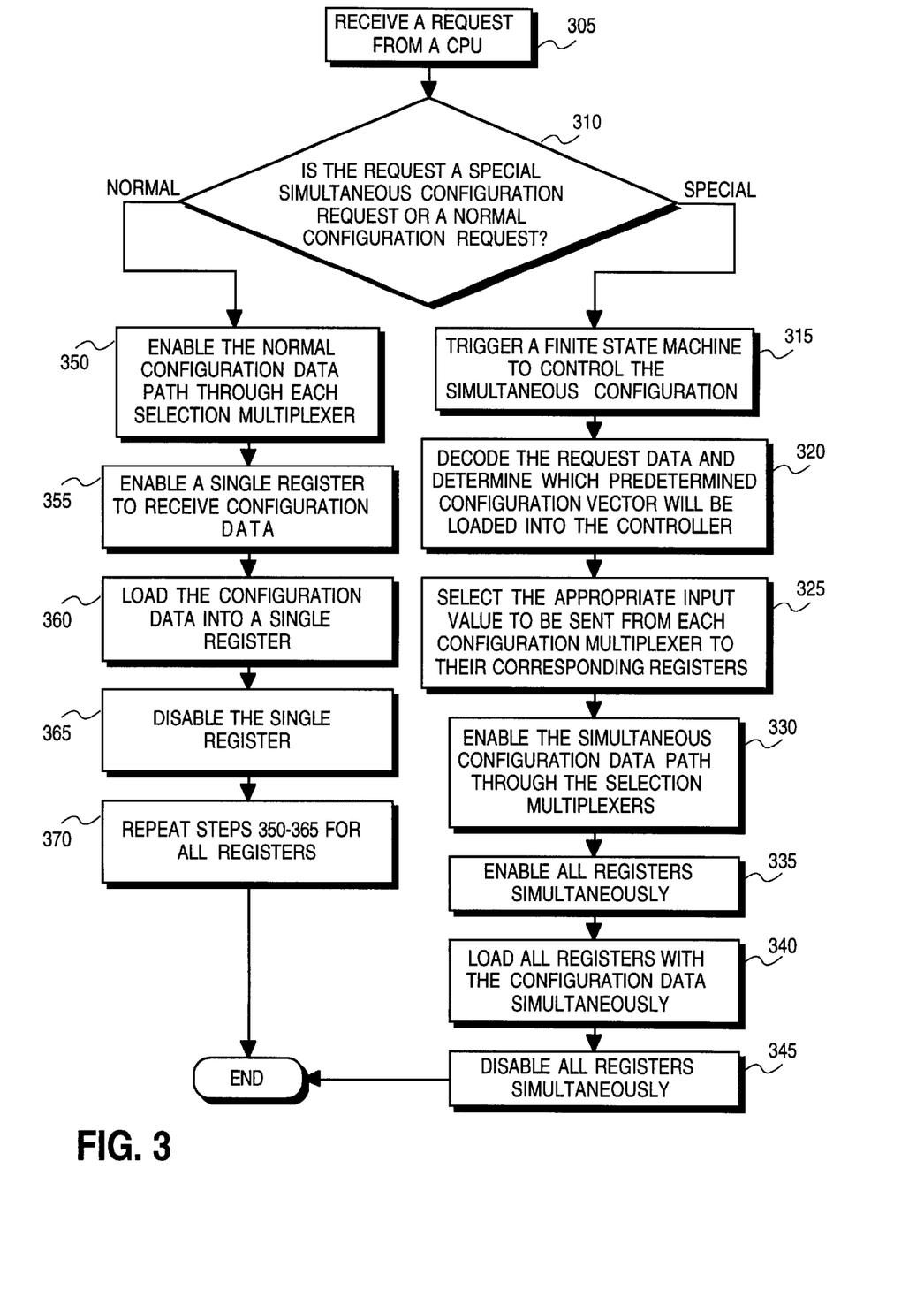
FIG. 3 is a flow diagram of an embodiment of a method for performing simultaneous configuration.

An embodiment of a method for performing simultaneous configuration is shown in FIG. 3. Referring to FIG. 3, the CPU sends a cycle, or request, to the memory controller, step 305. The CPU may be a software model of a CPU. The memory controller receives the cycle and determines if the cycle is a special simultaneous configuration write cycle, step 310.

When the CPU sends the simultaneous configuration write cycle request message, the request has a special address range that identifies it as simultaneous configuration request. The request also includes a data field. The data field specifies which predetermined configuration input vector to use. If the received cycle is a special simultaneous configuration cycle, then a finite state machine (FSM) is triggered and takes control 315. The FSM decodes the data in the received request and recognizes which predetermined configuration vector will be input into the memory controller registers. The FSM selects the appropriate input value $22n$ from the set of input values $220-22n$ to be sent from each multiplexer to the corresponding register or registers at step 325.

The simultaneous configuration path for all registers are simultaneously enabled and the normal data path are disabled, step 330. Thus, the normal data path is disabled at the selection multiplexer the selected simultaneous configuration data path, is enabled. A plurality of inputs to the registers of the controller are opened, the write path to each register is enabled, so that the registers can receive data. The registers are enabled sending an enable signal over enable line to all registers simultaneously, step 335. All values for the selected predetermined configuration input vector are simultaneously loaded into all registers by sending the appropriate value of $22n$ of the configuration vector from each multiplexer 208 across the simultaneous configuration path and into the corresponding register or registers, during step 340. Then, the plurality of inputs to the registers 231 are closed, the write path for each register is disabled, by disabling line 212, step 345.

If the received request is a normal configuration request, then the write path for one register is enabled, or opened, step 350. Then, an individual register's input is opened, step 355. The value for this register is loaded into the register, step 360. The input to the register is then closed, the write path for the register is disabled, step 365. These steps are repeated for each register in the memory controller, step 370. The simultaneous configuration method and apparatus that instantly configures a controller provides the advantage of reducing the time needed to test simulated computer architecture by over 25%.

Figure 4:
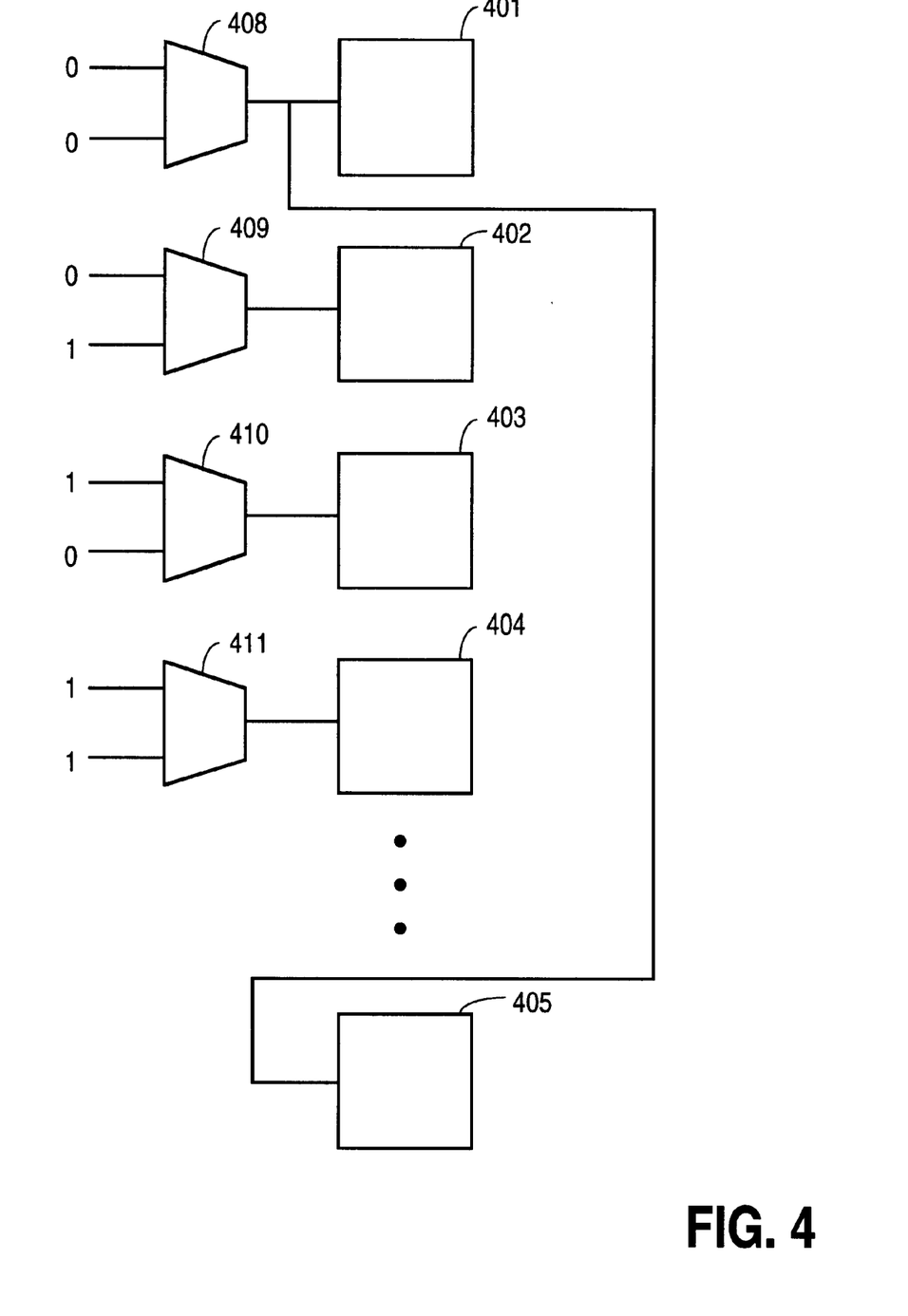
FIG. 4 is a block diagram of an embodiment of an apparatus with a complete set of input values for two predetermined configurations.

In one embodiment, each register 231 has a multiplexer 208 associated with the register. A separate, individual multiplexer with a predetermined set of input values may exist for each register. Alternatively, if the number of registers are longer than the number of predetermined sets of input values, then a multiplexer with a given set of input values can be used by a plurality of registers, as shown in FIG. 4.

For example, suppose that there are two predetermined configurations. Then there are four possible sets of input values for multiplexers 408, 409, 410, 411 as shown in FIG. 4. Thus, the four outputs of the multiplexers 408–411 provide all possible values for a given register. Thus, if all four possible sets are used to configure the memory controller, then only four multiplexers are needed to supply the configuration values to the memory controller registers. If the memory controller has five registers, for example, then the fifth register 405 will have the same set of input values as one of the other four registers.

Suppose that register 405 has the same set of input values as register 401. Register 405 then can receive its input from multiplexer 408. In other words, if the input value for registers 401 and 405 are 0 for the first predetermined configuration, and 0 for the second predetermined configuration, then the set of input values for multiplexer 408 can be used to configure both registers 401 and 405.

Figure 5:
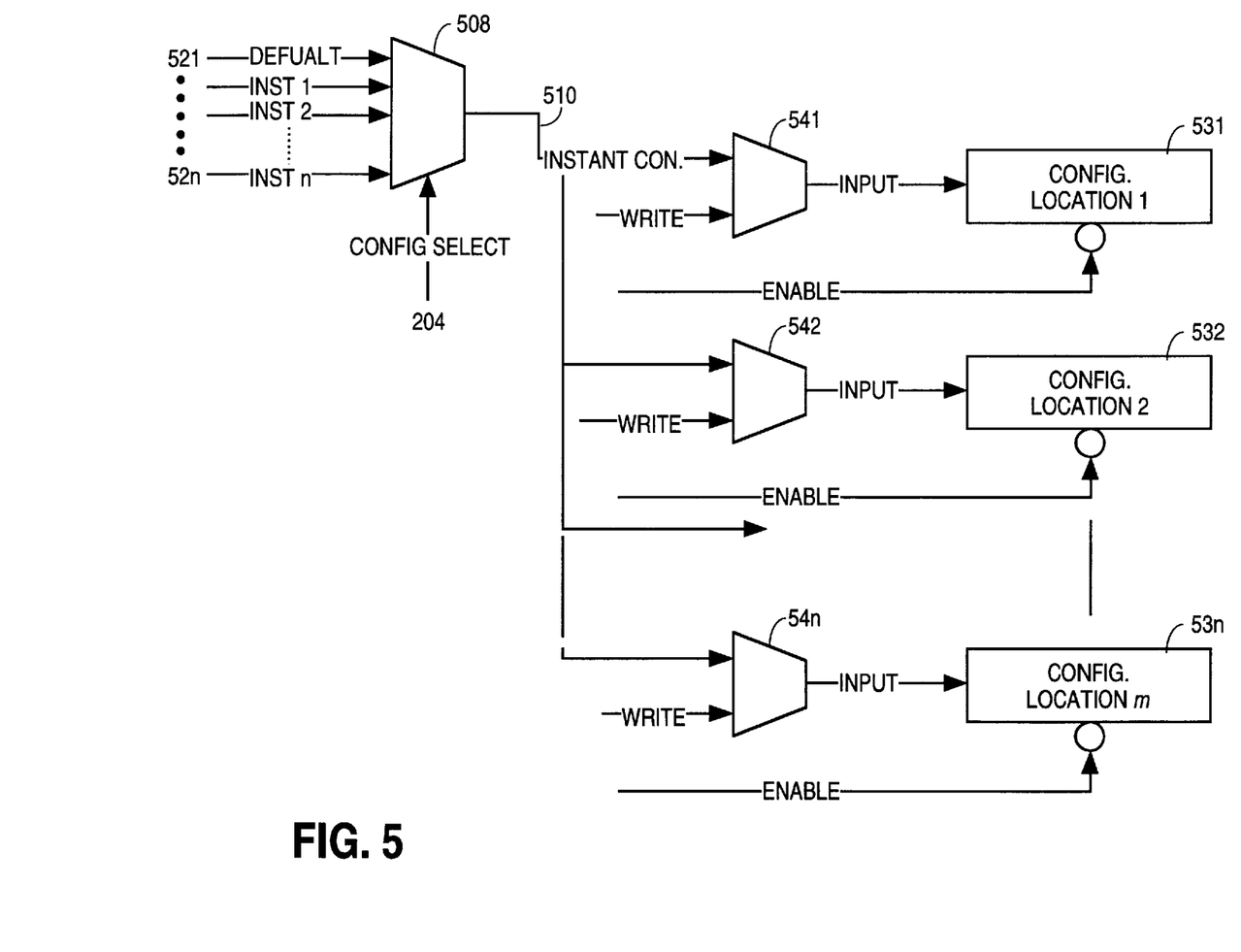
FIG. 5 shows a multiplexer with a given set of input values that can be used by a plurality of registers.

For n different predetermined configurations, there are $2^n$ possible unique combinations that can be input into a given multiplexer, as shown in FIG. 5. Multiplexer 508 has inputs 521 through 52n corresponding to predetermined inputs 1 through n. Thus, there are a maximum number of $2^n$ different, or unique, sets of values that can define the input set of values for the multiplexer 508. The maximum number of multiplexers needed to provide n different predetermined combinations is therefore $2^n$, or less than $2^n+1$.

For a controller that has more than $2^n$ registers that have to be programmed, or configured, there are at least $m-2^n$ registers that share a multiplexer with another register, where n is the number of registers in the controller. Therefore, associating a multiplexer having a given set of input values with two or more registers can significantly reduce the amount of extra gate logic needed to perform the simultaneous configuration of the controller.

FIG. 5 shows an embodiment of a multiplexer that sends simultaneous configuration data to a plurality of registers. When the simultaneous configuration request 504 is selected, multiplexer 508 sends a portion of the configuration input vector for one of the configurations 520 through 52n across simultaneous configuration line 510 through multiplexers 541 through 54n and into registers 531 through 53m.

Thus, the configuration multiplexer 508 of FIG. 5, is associated to a plurality of registers, reducing the overall number of multiplexers needed to perform the simultaneous configuration of the controller. In one embodiment, the amount of silicon area consumed by the simultaneous configuration logic that shares a multiplexer output with a plurality of registers is reduced to over 95% less that the area used by simultaneous configuration logic that does not provide a multiplexer output to more than one register.

In some embodiments, a number much less than $2^n$ is sufficient to provide all sets of unique values needed for a plurality of configurations of the controller. In these embodiments, the reduction in the number of transistor gates needed to implement the simultaneous configuration apparatus and method becomes more significant.

Figure 6:
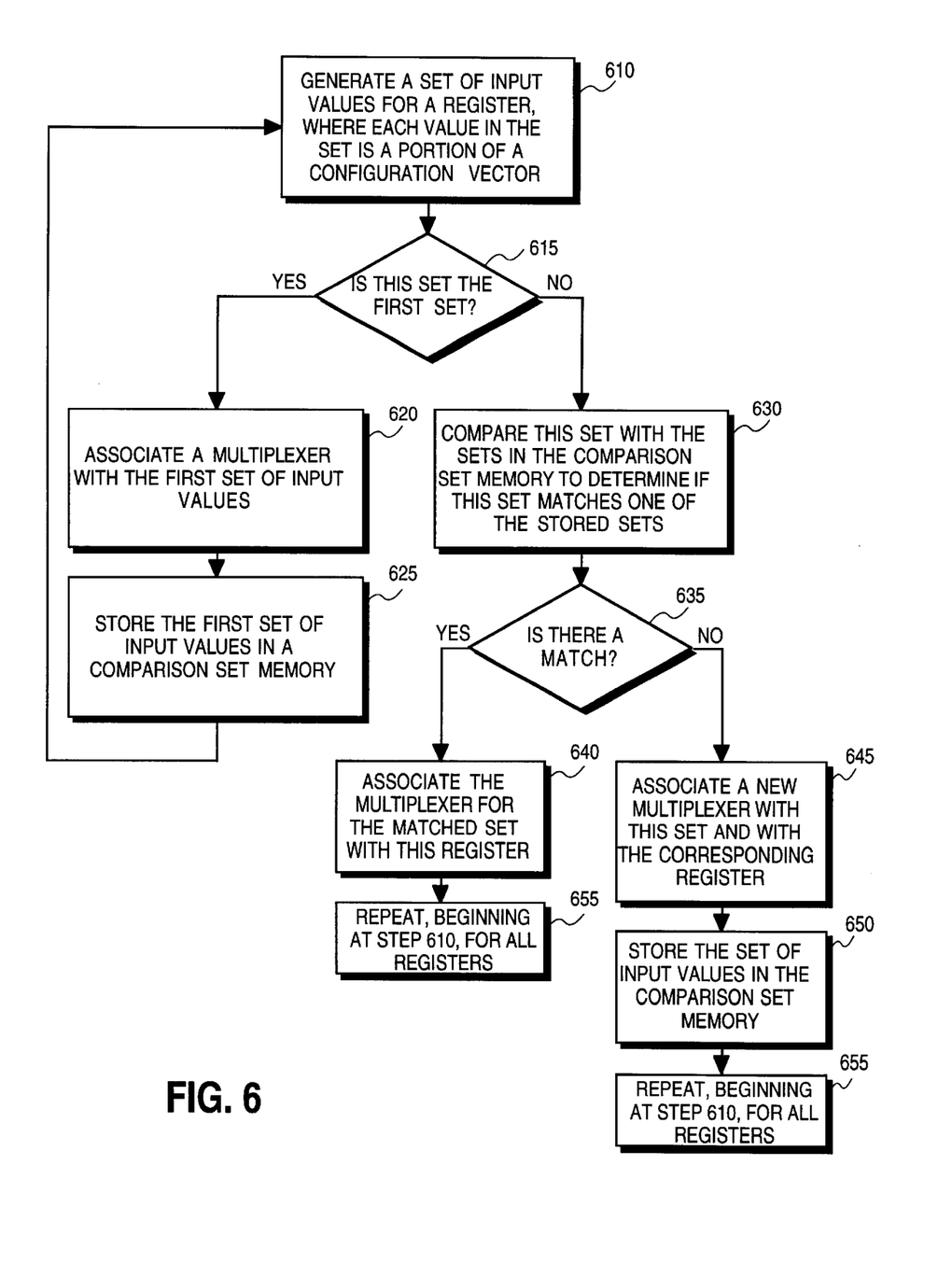
FIG. 6 is a flow diagram of an embodiment of a method for minimizing the configuration logic needed to perform simultaneous configuration.

The number of configuration multiplexers needed for n different configuration vectors is thus a function of the number of unique sets of register input values needed to define the n different configuration vectors. A method for minimizing the configuration logic as shown in FIG. 6, starts by generating a set of input values for a first register, step 610 where each value in the set is a portion of a configuration vector. The configuration vectors can be stored in a configuration table in memory.

Because this set of input values is the first set, 615, the set is used as the set of input values for an associated configuration multiplexer, and this multiplexer is associated with the register, 620. The set of input values is stored in a comparison set portion of memory, 625.

Next, a set of input values for a second register is generated, step 610. Because this set is not the first set, it is compared with the sets of input values stored in the comparison set memory, step 630, to determine if this set matches one of the stored sets. If this set matches one of the sets of values in the comparison set memory then the matched set in the memory is associated with the second register. The matched set of input values will be applied to one configuration multiplexer, and this configuration multiplexer will be associated with the corresponding registers that use this set of input values, step 640.

If the newly generated set of input values does not match a set of input values in the comparison set, then this unique set of input values is added to the comparison set, step 650. This set is associated with the corresponding register. Another configuration multiplexer needs to be associated with this set of input values and the corresponding register, step 645.

This process can be repeated for all registers in the controller, step 655. In this way, the configuration logic can use the minimum number of configuration multiplexers needed to simultaneously configure the controller during a single clock cycle. This provides the advantage of keeping the special simultaneous configuration architecture to a minimum.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

What is claimed is:

1. A method for a configuration controller comprising:
   selecting a configuration input vector; and
   placing at least a portion of the configuration input vector in a plurality of registers in the controller during a single clock cycle, wherein placing comprises:
   simultaneously enabling a plurality of registers;
   simultaneously loading at least a portion of the input vector into the registers; and
   simultaneously disabling the plurality of registers.

2. The method of claim 1 further comprising:
   receiving a request.

3. The method of claim 2 wherein receiving further comprises:

determining that the request is an simultaneous configuration request.

4. An apparatus for configuring a controller comprising:

means for selecting a configuration input vector; and means for placing at least a portion of the configuration input vector into a plurality of registers in the controller during a single clock cycle wherein means for placing comprises:

means for simultaneously enabling a plurality of registers;

means for simultaneously loading at least a portion of the input vector into the registers; and means for simultaneously disabling the plurality of registers.

5. The apparatus of claim 4 further comprising:

means for receiving a request.

6. The apparatus of claim 5 wherein receiving further comprises:

means for determining that the request is an simultaneous configuration request.

7. An apparatus for configuring a plurality of registers of a controller comprising:

a plurality of configuration multiplexers, each configuration multiplexer capable of selecting an input value from a plurality of input values, where each input value corresponds to a portion of a predetermined configuration input vector; and a plurality of simultaneous configuration data lines, each data line coupled between a corresponding configuration multiplexer and a corresponding register, each data line capable of transmitting the selected input value from the corresponding configuration multiplexer to the corresponding register.

8. The apparatus of claim 7 further comprising:

a plurality of selection multiplexers, each selection multiplexer located between a corresponding simultaneous configuration data line and a corresponding register.

9. The apparatus of claim 8, wherein each configuration multiplexer is capable of receiving an simultaneous configuration signal, where the received simultaneous configuration signal places the apparatus in an simultaneous configuration state.

10. The apparatus of claim 9 wherein each selection multiplexer further comprises:

an simultaneous configuration input to receive the selected input value from the corresponding configuration multiplexer during the simultaneous configuration state; and a normal write input to receive a value during a normal configuration state; and an output to transmit the received input value to the corresponding register.

11. The apparatus of claim 10 wherein:

the selected input value from at least one configuration multiplexer is provided to a plurality of registers.

12. The apparatus of claim 11 wherein:

the selected input value is capable of being transferred from the at least one configuration multiplexer to the plurality of registers simultaneously.

13. The apparatus of claim 7 wherein:

the plurality of configuration multiplexers are capable of sending the selected input values to the corresponding registers simultaneously.

14. A computer readable medium containing executable instructions, which, when executed in a processing system, causes the system to perform the steps for configuring a controller, comprising:

selecting a configuration input vector; and placing at least a portion of the configuration input vector in a plurality of registers in the controller simultaneously wherein placing comprises:

simultaneously enabling a plurality of registers;

simultaneously loading at least a portion of the input vector into the registers; and simultaneously disabling the plurality of registers.

15. The medium of claim 14, further comprising instructions for:

receiving a request.

16. The medium of claim 15 further comprising instructions for:

determining that the request is an simultaneous configuration request.

17. A computer readable medium containing executable instructions which, when executed in a processing system, causes the system to perform the steps for determining configuration input sets comprising:

generating a set of input values for a register, where each value in the set is a portion of a configuration vector;

comparing the generated set with one or more sets of input values in a comparison set;

determining if the generated set matches one of the sets from the comparison set;

adding the generated set to the comparison set if the generated set does not match one of the sets from the comparison set.

18. The medium of claim 17 further comprising instructions for if the generated set matches one of the sets in the comparison set, associating the matching set in the comparison with the register.

19. The medium of claim 18, further comprising instructions for associating each set of input values in the comparison set with a corresponding configuration multiplexer.

\* \* \* \* \*